United States Patent [19]

Budinski et al.

[11] Patent Number: 4,546,465
[45] Date of Patent: Oct. 8, 1985

[54] OPTICAL DISC ASSEMBLY RETAINING RINGS

[75] Inventors: Kenneth G. Budinski, Rochester; Kenneth F. Brandon, Webster, both of N.Y.

[73] Assignee: Eastman Kodak Company, Rochester, N.Y.

[21] Appl. No.: 438,565

[22] Filed: Nov. 3, 1982

[51] Int. Cl.⁴ ............................................. G01D 15/32
[52] U.S. Cl. .................................... 369/287; 160/392; 346/135.1; 346/137; 369/284; 369/286
[58] Field of Search ................. 369/284, 286, 287; 220/256, 257, 258, 82 R; 346/135.1, 137; 160/392

[56] References Cited

U.S. PATENT DOCUMENTS

| | | | |
|---|---|---|---|
| 3,273,633 | 9/1966 | Seidmon et al. | 160/392 |
| 4,195,312 | 3/1980 | Bell et al. | 369/284 |
| 4,267,876 | 5/1981 | Bloomfield | 160/392 |
| 4,365,258 | 12/1982 | Geyer et al. | 369/284 |
| 4,380,016 | 4/1983 | Lehureau et al. | 369/284 |
| 4,408,213 | 10/1983 | Bell | 369/284 |
| 4,453,246 | 6/1984 | Covington | 369/291 |

*Primary Examiner*—Steven L. Stephan
*Attorney, Agent, or Firm*—Milton S. Sales

[57] ABSTRACT

An optical disc assembly includes a flexible disc-shaped support carrying a record layer. The support has an information storage region. A pair of annular retaining ring members engage opposite sides of an annular peripheral region of the support as the ring members close together to clamp the support therebetween. The peripheral region of the support is wrapped about an annular reference surface of one ring member and is pushed into an annular recess in that ring member. Co-operative surfaces on the ring members provide a locking interfit therebetween with the peripheral region of the support interleaved between the ring members.

3 Claims, 5 Drawing Figures

OPTICAL DISC ASSEMBLY RETAINING RINGS

CROSS-REFERENCE TO RELATED APPLICATION

Reference is made herein to commonly-assigned, copending U.S. Pat. No. 4,365,258, issued Dec. 21, 1982 in the names of F. F. Geyer and E. M. Leonard.

BACKGROUND OF THE INVENTION

1. Field of the Invention

The present invention relates to record medium assemblies useful in high density storage of information by optical writing and/or reading, and more particularly to improved configurations for optical disc assembly retaining rings.

2. Description of the Prior Art

The currently preferred optical disc technology employs disc elements with spiral or concentric tracks of minute (e.g., on the order of a micron or less in size), optically-detectable marks. One real-time mode of recording (writing) such marks is by scanning tracks on the disc with an equivalently small beam of radiation (e.g., from a laser) which is modulated "off or on" according to an electrical signal representative of the information to be written. Information is recovered (read) by scanning the tracks with the same size or only slightly larger, but still very tightly focused, radiation (e.g. light) spot. The recovered information is in the form of a fluctuating electrical signal obtained from a photodetector that senses the read-out light reflected from the recorded disc.

In order to write and read information in the form of such minute markings, optical systems of high numerical aperture are used to focus light to equivalently minute spots. Such optical systems have extremely small depths of focus and the proper positional relation between the writing or reading optical system, and the optical disc record surface must be stringently maintained both smooth and flat.

One approach to achieve requisite smoothness, flatness and protective requirements for high density storage of information is disclosed in commonly-assigned, copending U.S. Pat. No. 4,365,258, issued Dec. 21, 1982 in the names of F. F. Geyer and E. M. Leonard. In that approach an improved optical disc assembly adapted for high density storage of information comprises (i) a flexible, disc-shaped support carrying a record layer; (ii) a transparent disc-shaped cover sheet opposing the record layer, and (iii) an annular retaining ring for holding the support and cover sheet in circumferentially-symmetric tension.

SUMMARY OF THE INVENTION

By the present invention, improved tensioning of the support is achieved and manufacturing operations are simplified.

An optical disc assembly in accordance with the invention includes a flexible disc-shaped support carrying a record layer. The support has an information storage region.

A pair of annular retaining ring members engage opposite sides of an annular peripheral region of the support as the ring members close together to clamp the support therebetween. The peripheral region of the support is wrapped about an annular reference surface of one ring member and is pushed into an annular recess in that ring member. Cooperative surfaces on the ring members provide a locking interfit therebetween with the peripheral region of the support interleaved between the ring members.

The invention and its objects and advantages, will become more apparent in the detailed description of the preferred embodiments presented below.

BRIEF DESCRIPTION OF THE DRAWINGS

The description of preferred embodiments refers to the attached drawings wherein.

DESCRIPTION OF THE PREFERRED EMBODIMENTS

Figure 1:
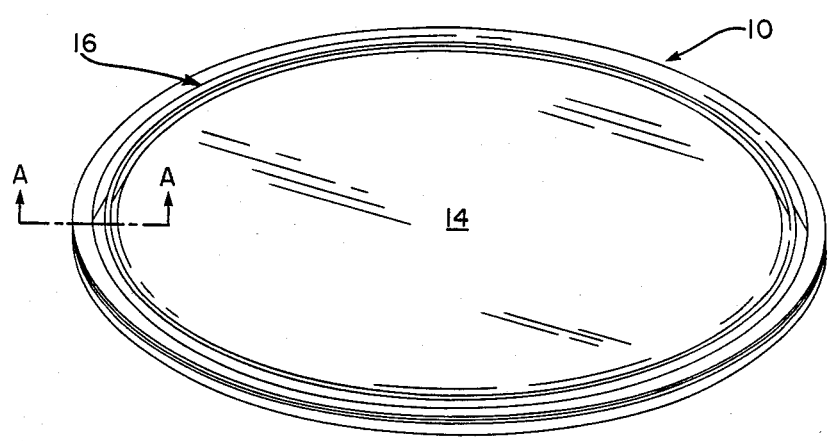
FIG. 1 is a perspective schematic view of one embodiment of an optical disc assembly according to the present invention.
Figure 2:
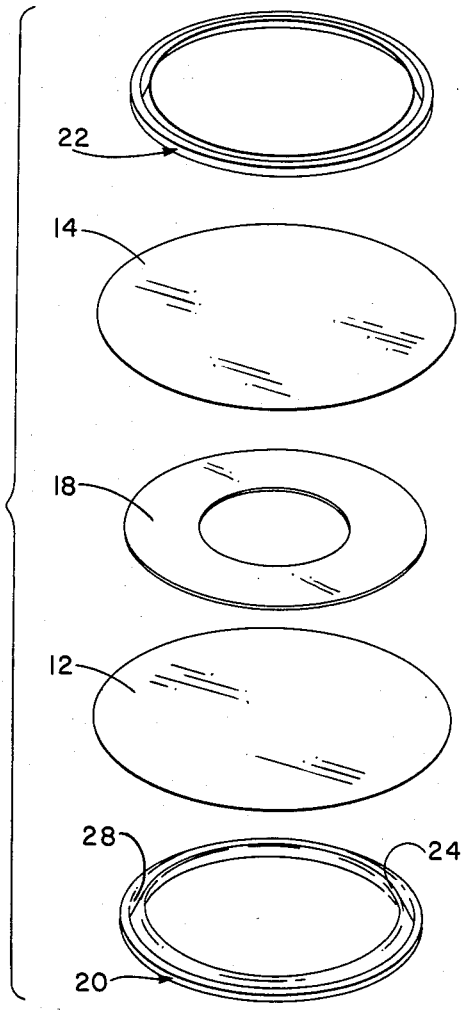
FIG. 2 is an exploded perspective view of the disc assembly of FIG. 1.

Referring to FIGS. 1 and 2, an optical disc assembly 10 includes a web assembly having a flexible, disc-shaped support 12 carrying a record layer (and other appropriate layers) on one major surface of the support. The web assembly also includes a continuous, flexible, disc-shaped cover sheet 14 which is substantially transparent with respect to the write and/or read wavelength suitable for use with the record layer. The diameter of cover sheet 14 corresponds generally to the diameter of support 12.

The support and cover sheet are held in spaced relation by an annular composite retaining ring 16 and spacer 18. The retaining ring engages support 12 and cover sheet 14 substantially continuously at respective annular peripheral portions thereof. The web assembly has a predetermined information storage region radially inwardly of retaining ring 16 and spacer 18. Reference is made to aforementioned U.S. Pat. No. 4,365,258 for a description of useful and preferred materials and characteristics for the disc-shaped support and the cover sheet.

The web assembly is retained in circumferentially-symmetric tension by cooperating first and second annular ring members 20 and 22, respectively, of composite retaining ring 16 engaging opposed sides of the peripheral region of the web assembly. It is preferred that the cooperative engagement between disc-shaped support 12, cover sheet 14, and spacer 18 significantly seal the space between the record layer on support 12 and the opposed surface of cover sheet 14. Although not included in the illustrated embodiments, the optical disc assembly may have a central rigid hub including spacing means for maintaining proper spacing between the record layer and the cover sheet.

Preferred tensions for the disc-shaped support and cover sheet materials are from substantially zero to just below the elastic limit, or yield point, of those materials. More specifically, the preferred tensions depend upon the desired degree of planarity for the particular member (i.e. size, composition; etc.). It is preferred that support material tension be below the elastic limit of the particular material; however, in certain applications some yield can be acceptable as long as surface planarity remains in the desired tolerance. In general, the tension should be selected with respect to the support material so that the stressed material's continuous relaxation over time (i.e. material creep) is slow enough to insure adequate spacing and planarizing tension throughout the expected product life period.

Figure 3:
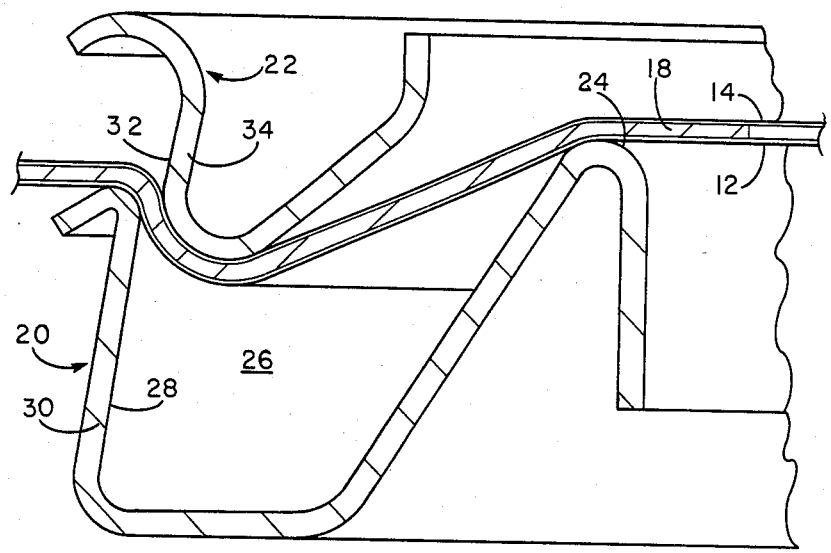
FIG. 3 is a fragmented sectional view of the disc assembly of FIG. 1 at an intermediate stage of assembly operations.
Figure 4:
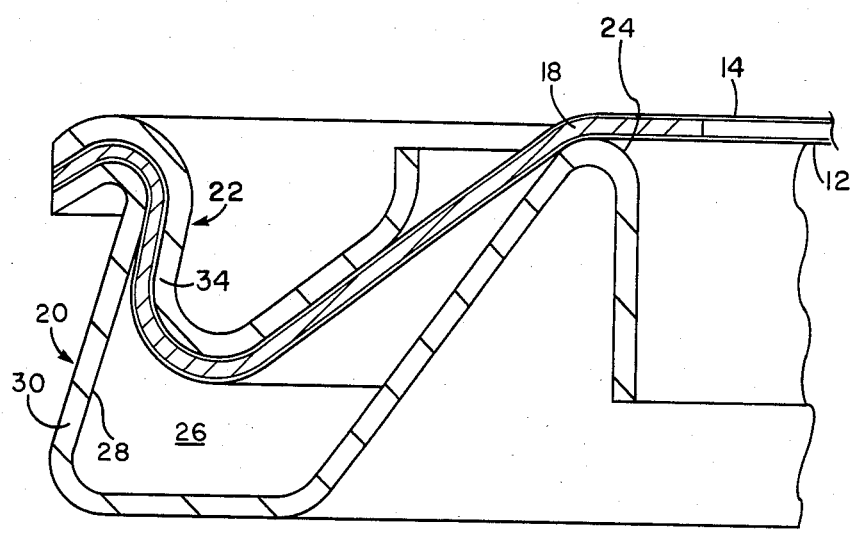
FIG. 4 is a fragmented sectional view taken along line A—A of FIG. 1 after assembly operations.

Referring to FIGS. 3 and 4, retaining ring member 20 has an annular reference surface 24 against which support 12 is positioned to locate the storage region in a predetermined plane. Ring member 20 also has an annular recess 26 with a generally U-shaped cross-sectional shape open at the side facing support 12. Radially inwardly facing surface 28 of outer wall 30 has a profile sloping inwardly towards the open side of the recess to form an undercut region.

Second ring member 22 has a radially outwardly facing surface 32 on its outer wall 34 with a profile cooperative with that surface 28 of wall 30. Surfaces 28 and 32 cooperate to clamp the web assembly therebetween and to provide a locking interfit (i.e., a snap fit) when ring member 22 is within recess 26 and when the annular peripheral region of the web assembly is interleaved between the ring members, as shown in FIG. 4.

During the assembly operation, support 12 and cover sheet 14 are placed under circumferentially-symmetric radial tension with ring members 20 and 22 on opposed sides thereof. The ring parts are aligned with annular spacer 18, and brought together (FIG. 3) to begin pressing the web assembly around reference surface 24. FIG. 3 shows the parts at the point of tightest fit. As ring member 22 moves into recess 26, wall 30 snaps over wall 34 to lock the assembly together (FIG. 4). Now the web can be cut free of the tensioning mechanism, not shown.

Figure 5:
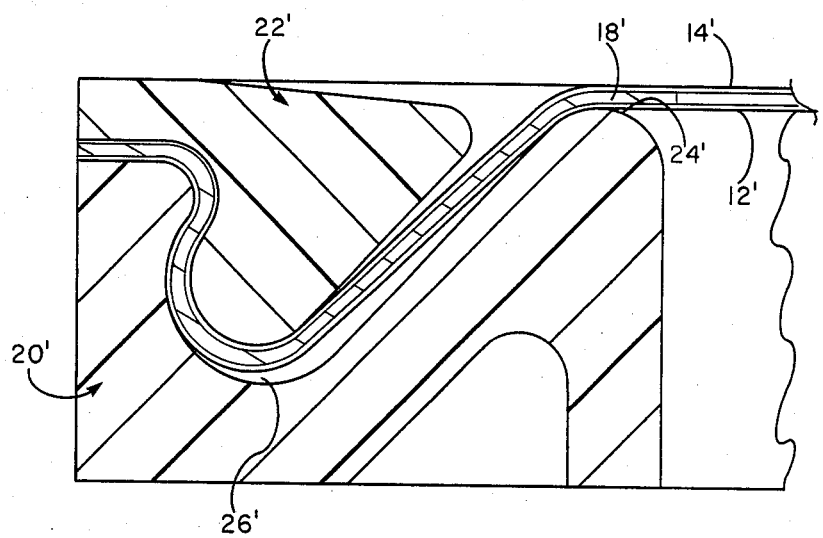
FIG. 5 is a fragmented sectional view similar to FIG. 4 of a second embodiment of an optical disc assembly according to the present invention.

In the embodiment illustrated in FIGS. 1-4, ring members 20 and 22 are preferably made of metal such as by spin forming, roll forming, stamping or other suitable technique. FIG. 5 shows a portion of an optical disc assembly having first and second ring members 20' and 22' of molded plastic. Alternatively, one ring member may be plastic and the other metal. In FIG. 5, like reference numerals are used to refer to structure shown in FIGS. 1-4, except that in FIG. 4, prime marks have been added to all numerals.

The invention has been described in detail with particular reference to certain preferred embodiments thereof, but it will be understood that variations and modifications can be effected within the spirit and scope of the invention.

We claim:

1. An optical disc assembly comprising:
   a flexible, disc-shaped support carrying a record layer, said support having an information storage region and an annular peripheral region radially outward of said storage region;
   an annular retaining ring engaging said peripheral region of said support, said retaining ring comprising first and second ring members on opposed sides of said support;
   an annular recess on said first ring member, said recess having a generally U-shaped cross-sectional shape (1) open at the side facing said support for receiving said second ring member and (2) having an annular undercut region;
   an annular reference surface on said first ring member radially inwardly of said recess against which said support can be positioned to locate said record layer in a predetermined plane; and
   a surface on said ring member, and being cooperative with said undercut region on said first ring member for providing a locking interfit therebetween with said second ring member at least partially within said annular undercut region on said first ring member, said annular peripheral region of said support being positioned against said annular reference surface and interleaved between the ring members within said recess in clamped circumferentially-symmetric tension.

2. An optical disc assembly comprising:
   a flexible, disc-shaped web assembly including (1) a support carrying a record layer and (2) a cover sheet spaced from and opposing said record layer, said web assembly having an information storage region and an annular peripheral region radially outward of said storage region;
   an annular retaining ring engaging said peripheral region of said web assembly, said retaining ring comprising first and second ring members on opposed sides of said web assembly;
   an annular recess on said first ring member, said recess having a generally U-shaped cross-sectional shape (1) open at the side facing said web assembly for receiving said second ring member and (2) having an annular undercut region;
   an annular reference surface on said first ring member radially inwardly of said recess against which said support can be positioned to locate said record layer in a predetermined plane;
   a surface on said second ring member, and being cooperative with said undercut region on said first ring member for providing a locking interfit therebetween with said second ring member at least partially within said annular undercut region on said first ring member, said annular peripheral region of said web assembly being positioned against said annular reference surface and interleaved between the ring members within said recess in clamped circumferentially-symmetric tension.

3. An annular retaining ring for receiving a flexible, disc-shaped support having a record layer, an information storage region, and an annular peripheral region radially outward of the storage region; said annular retaining ring engaging the peripheral region of said support and comprising:
   first and second ring members on opposed sides of the support;
   an annular recess on said first ring member, said recess having a generally U-shaped cross-sectional shape (1) open at the side facing the support for receiving said second ring member and (2) having an annular undercut region;
   an annular reference surface on said first ring member radially inwardly of said recess against which a received support can be positioned to locate the support's record layer in a predetermined plane; and
   a surface on said second ring member, and being cooperative with said undercut region on said first ring member for providing a locking interfit therebetween with said second ring member at least partially within said annular undercut region on said first ring member, the annular peripheral region of the support being interleaved between the ring members within said recess in clamped circumferentially-symmetric tension.

* * * * *